(12) United States Patent
Ferri et al.

(10) Patent No.: US 11,305,609 B2
(45) Date of Patent: Apr. 19, 2022

(54) FRESH AIR FILTER REGENERATION FOR AN HVAC SYSTEM IN A WORK VEHICLE

(71) Applicant: CNH Industrial America LLC, New Holland, PA (US)

(72) Inventors: Doriano Ferri, St. Gilles (BE); Joaquim Guitart Corominas, Barcelona (ES)

(73) Assignee: CNH Industrial America LLC, New Holland, PA (US)

( * ) Notice: Subject to any disclaimer, the term of this patent is extended or adjusted under 35 U.S.C. 154(b) by 104 days.

(21) Appl. No.: 16/612,731

(22) PCT Filed: May 10, 2018

(86) PCT No.: PCT/EP2018/062166
§ 371 (c)(1),
(2) Date: Nov. 11, 2019

(87) PCT Pub. No.: WO2018/206740
PCT Pub. Date: Nov. 15, 2018

(65) Prior Publication Data
US 2020/0164723 A1 May 28, 2020

(30) Foreign Application Priority Data
May 11, 2017 (IT) .......................... 102017000051396

(51) Int. Cl.
*B60H 1/00* (2006.01)
*B01D 46/00* (2022.01)
(Continued)

(52) U.S. Cl.
CPC ..... *B60H 1/00378* (2013.01); *B01D 46/0068* (2013.01); *B01D 46/44* (2013.01); *B60H 1/00735* (2013.01); *B60H 1/00864* (2013.01); *B60H 1/26* (2013.01); *B60H 3/0633* (2013.01); *B01D 2279/50* (2013.01); *B60H 2001/00099* (2013.01); *B60H 2001/00221* (2013.01)

(58) Field of Classification Search
CPC ............ B01D 46/0068; B01D 46/0057; B01D 46/0067; B01D 46/44; B60H 2001/00221; B60H 3/06; B60H 3/0633
USPC .......................................................... 95/148
See application file for complete search history.

(56) References Cited
U.S. PATENT DOCUMENTS

| 7,377,848 B2 * | 5/2008 | Voit, II | B60H 1/00378 296/190.09 |
| 9,987,581 B2 * | 6/2018 | Leconte | B01D 46/0067 |

(Continued)

*Primary Examiner* — Vivek K Shirsat
*Assistant Examiner* — Ko-Wei Lin
(74) *Attorney, Agent, or Firm* — Rickard K. DeMille; Rebecca L. Henkel

(57) ABSTRACT

An HVAC system for use with an operator cab of a work vehicle is characterized by an air duct arrangement in communication with a first fan outlet and second fan outlet. At least one air flow diverter is positioned within the air duct arrangement for selectively diverting air flowing through the air duct arrangement. During a "fresh air filter regeneration" mode the at least one air flow diverter closes the air duct arrangement, the first fan is activated, and the second fan is deactivated, whereby discharge air from the first fan flows through the second fan in a reverse direction and flows through the fresh air filter.

13 Claims, 7 Drawing Sheets

(51) Int. Cl.
*B01D 46/44* (2006.01)
*B60H 1/26* (2006.01)
*B60H 3/06* (2006.01)

(56) References Cited

U.S. PATENT DOCUMENTS

2013/0059521 A1\* 3/2013 Loup .................... B60H 3/0633
454/158
2016/0367928 A1\* 12/2016 Leconte ............... B01D 46/446

\* cited by examiner

FRESH AIR FILTER REGENERATION FOR AN HVAC SYSTEM IN A WORK VEHICLE

CROSS REFERENCE TO RELATED APPLICATIONS

This application is a US National Stage filing of International Application Serial No. PCT/EP2018/062166 entitled "FRESH AIR FILTER REGENERATION FOR AN HVAC SYSTEM IN A WORK VEHICLE," filed May 10, 2018, which claims priority to Italian Application Serial No. 102017000051396, filed May 11, 2017, each of which is incorporated by reference herein in its entirety for all purposes.

BACKGROUND OF THE INVENTION

The present invention relates generally to a climate control system for the interior of an operator cab of a self-propelled work vehicle such as a tractor, agricultural harvesting machine, or the like, and more particularly, to such a climate control system which is configured for regeneration of a fresh air filter.

Work vehicles are used in the agricultural, industrial, mining, construction and forestry technology sectors to perform various work functions, such as plowing, cultivating, harvesting, combining, etc. To improve operator comfort, such work vehicles are commonly provided with an operator cab in which the operator is located. The operator cab in general includes a metal frame with upright posts, a roof, and transparent glass or plastic panels extending between the upright posts. The operator can operate various levers, switches, etc. from within the cab to perform various desired functions, such as engaging or disengaging a power-take-off, actuating remote hydraulic cylinders, selecting a throttle speed, etc.

Environmental conditions such as temperature, humidity and/or air pressure within an enclosed operator cab are typically controlled or regulated using a climate control system, also commonly referred to as a Heating Ventilating and Air-Conditioning (HVAC) system. The HVAC system of a work vehicle typically includes several operator operable controls located within the cabin including, but not limited to, a mode selector, a temperature selector, and a fan speed selector. The mode selector will typically allow selecting a heat mode, an air conditioning mode, a window defrost defog mode, an air recirculation mode, and a fresh air mode. Additionally, some systems may be operable in an automatic temperature control (ATC) mode wherein the system controls the cabin air temperature to or within a range of an operator selectable value. Still further, some systems may be operable in a mode which automatically controls the fan speed and other elements of the system to maintain the cabin air pressure at a level above that of outside air, to limit infiltration into the cabin of outside air, dust and other contaminants from the outside environment.

U.S. Pat. No. 8,633,424, which is assigned to the assignee of the present invention, discloses an HVAC system with two centrifugal blowers. One blower is used for pressurizing the operator compartment with outside air and the other blower is used for recirculating air within the operator compartment. The two blowers are fluidly connected in series with each other such that the outlet of the pressurizing blower is in communication with the inlet of the recirculation blower.

It is also known to automatically clean the filter located in the duct between the outside ambient environment and the HVAC blower. EP2552719B1 (corresponding to U.S. Patent Publication No. US 2013/0059521) discloses an HVAC system with a single blower. A mixing flap is positioned on the upstream side of the blower to allow selective intake of recirculation air from the cab interior and/or outside air through the filter. A number of air distribution vents are located on the downstream side of the blower to direct the pressurized air to selective areas within the cab. In a "filter regeneration" mode the air distribution vents on the downstream side are closed, and the mixing flap is positioned to only intake recirculation air and close the inlet leading to the filter. A return duct leading from the outlet side of the blower back toward the filter allows the pressurized air to be returned to the filter to blow air in a reverse direction through the filter and thereby regenerate the filter.

SUMMARY OF THE INVENTION

The present invention provides an HVAC system for a work vehicle including a pair of blowers, wherein a downstream duct arrangement can be closed, and air from a recirculation blower is used to blow air through a pressurization blower and fresh air filter to clean and regenerate the fresh air filter.

The invention in one form is directed to an HVAC system for an operator cab of a work vehicle. The HVAC system includes a first fan having an inlet and an outlet, with the first fan inlet being in communication with an interior of the operator cab. A second fan has an inlet and an outlet, with the second fan inlet being in communication with an exterior ambient environment. A fresh air filter is positioned in communication with the inlet of the second fan. The HVAC system is characterized by an air duct arrangement in communication with the first fan outlet and second fan outlet. At least one air flow diverter is positioned within the air duct arrangement for selectively diverting air flowing through the air duct arrangement. During a "fresh air filter regeneration" mode the at least one air flow diverter closes the air duct arrangement, the first fan is activated, and the second fan is deactivated, whereby discharge air from the first fan flows through the second fan in a reverse direction and flows through the fresh air filter.

In another embodiment, the HVAC module includes a recirculation box coupled with an inlet to the second fan. The recirculation box controls an amount of recirculation air and fresh air that are drawn into the second fan. The recirculation box has a controllable first door in communication with the interior of the operator cab, and a controllable second door in communication with the exterior ambient environment. The first door is closed and the second door is opened during the fresh air filter regeneration mode.

In another embodiment, the air duct arrangement includes at least one distribution plenum, with each distribution plenum having at least one outlet and an inlet in communication with the first fan outlet and the second fan outlet. Each distribution plenum includes at least one air flow diverter. The electrical processing circuit is configured in the fresh air filter regeneration mode to position the at least one air flow diverter to close the outlet(s) of each distribution plenum.

In another embodiment, the operator cab includes a first access door and a second access door, and the HVAC system further includes a first door sensor associated with the first access door, and a second door sensor associated with the second access door. The first door sensor and the second door sensor are each coupled with and provide an output signal to the electrical processing circuit. The fresh air filter is positioned at a top of the operator cab near the second access door. The electrical processing circuit initiates the fresh air filter regeneration mode when the output signal from the first door sensor indicates that the first door is open, and when the output signal from the second door sensor indicates that the second door is closed.

In another embodiment, the electrical processing circuit initiates the fresh air filter regeneration mode dependent upon a time basis. The time basis can correspond to a predetermined number of operating hours for the work vehicle.

In yet another embodiment, the air duct arrangement includes a front delivery layout having at least one air flow diverter, and a rear delivery layout having at least one air flow diverter. The electrical processing circuit controls each air flow diverter during the fresh air filter regeneration mode to close the front delivery layout and the rear delivery layout.

In yet another embodiment, the HVAC system includes an HVAC module containing the first fan and the second fan. The front delivery layout includes a distribution plenum having a plurality of outlets and an inlet in communication with the first fan outlet and the second fan outlet. The distribution plenum includes at least one air flow diverter for selectively opening and closing the plurality of outlets.

In a further embodiment, the HVAC module includes a recirculation box coupled with an inlet to the second fan. The recirculation box controls an amount of recirculation air and fresh air that are drawn into the second fan. The recirculation box has a controllable first door coupled with the electrical processing circuit and in communication with the interior of the operator cab, and a controllable second door coupled with the electrical processing circuit and in communication with the exterior ambient environment. The first door is closed and the second door is opened during the fresh air filter regeneration mode.

In a still further embodiment, the first fan is a recirculation blower and the second fan is a pressurization blower.

In an additional embodiment, the work vehicle is an agricultural tractor.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
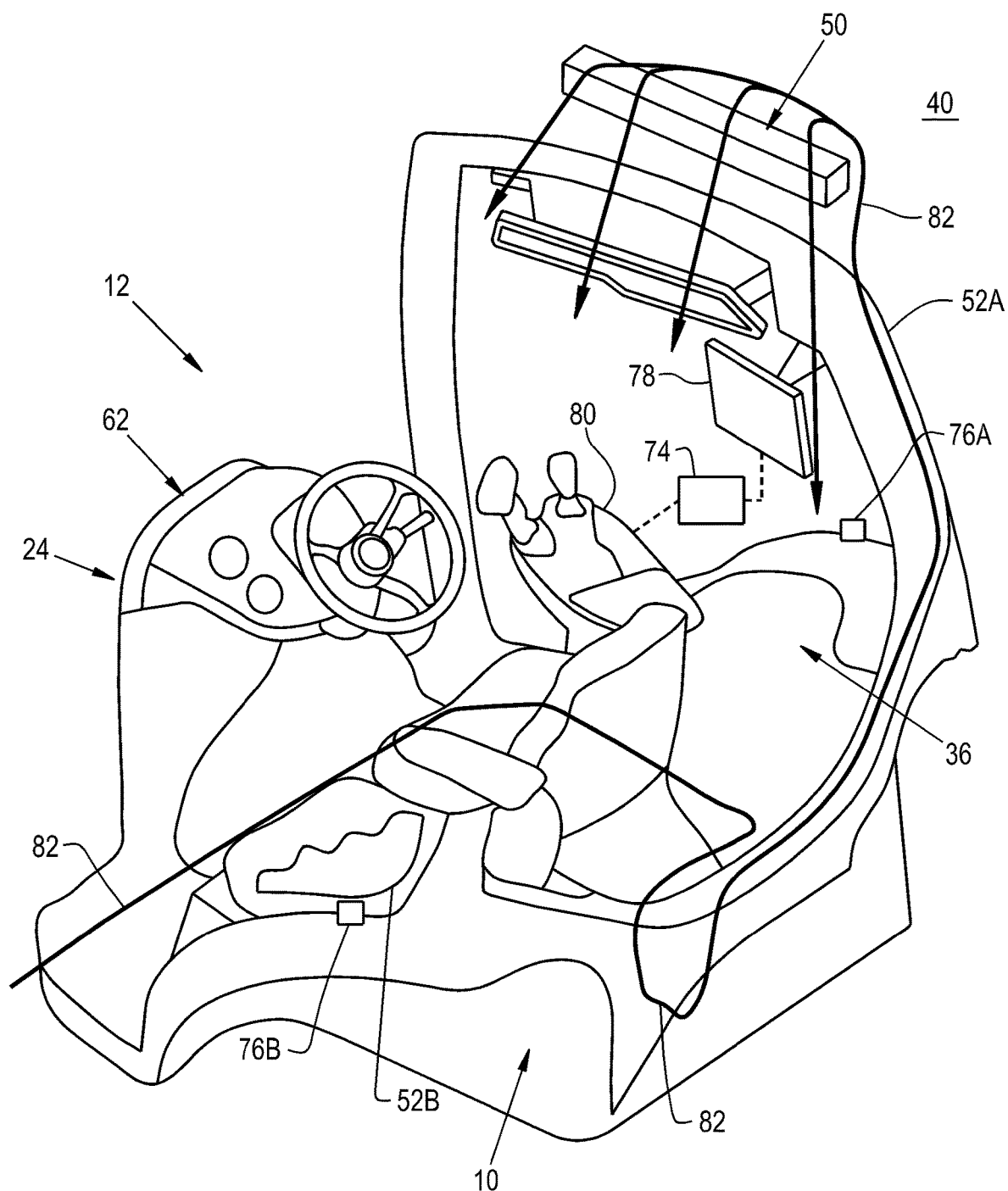
FIG. 1 is a perspective view of a portion of an operator cab that can be used on a work vehicle, including an embodiment of an HVAC system of the present invention.
Figure 2:
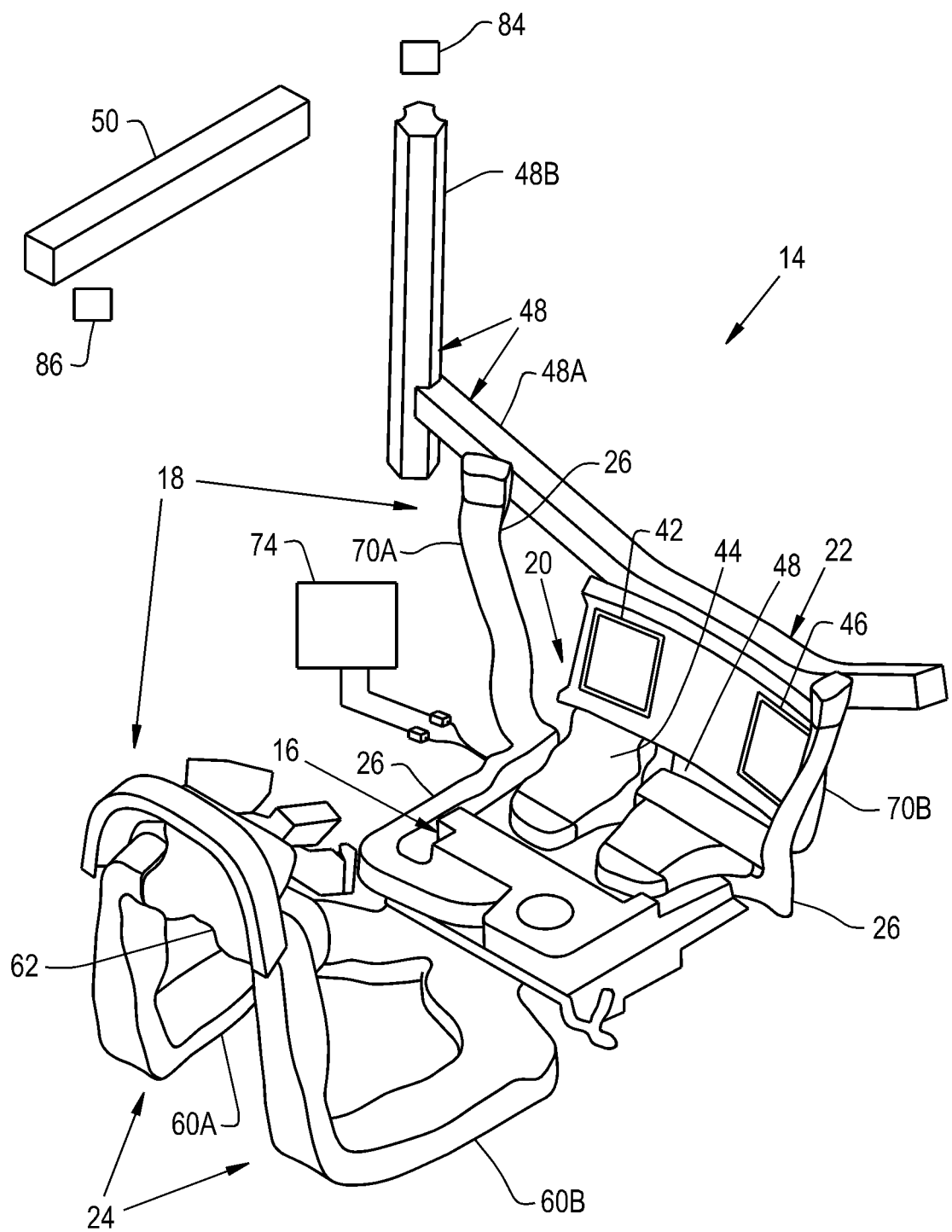
FIG. 2 is a perspective view of the HVAC system used in the operator cab shown in FIG. 1.

Referring now to the drawings, and more particularly to FIGS. 1 and 2, there is shown a portion of an operator cab 10 that can be used on a work vehicle 12. In the illustrated embodiment, the work vehicle 12 is assumed to be an agricultural tractor, but could be a different type of work vehicle, such as a combine, windrower, backhoe, dozer, excavator, feller-buncher, etc. The operator cab 10 is intended to improve the comfort of the operator.

An HVAC system 14, shown in perspective view in FIG. 2, is primarily intended to provide heating, cooling, and filtered air to the interior of the operator cab 10. The HVAC system 10 generally includes an HVAC module 16, and an air duct arrangement 18. The air duct arrangement 18 can be further thought of as being subdivided into a recirculation layout 20 and a fresh air layout 22 on the intake side, and a front delivery layout 24 and a further parallel delivery layout 26, for instance a rear delivery layout 26 or a side delivery layout, on the discharge side.

Figure 3:
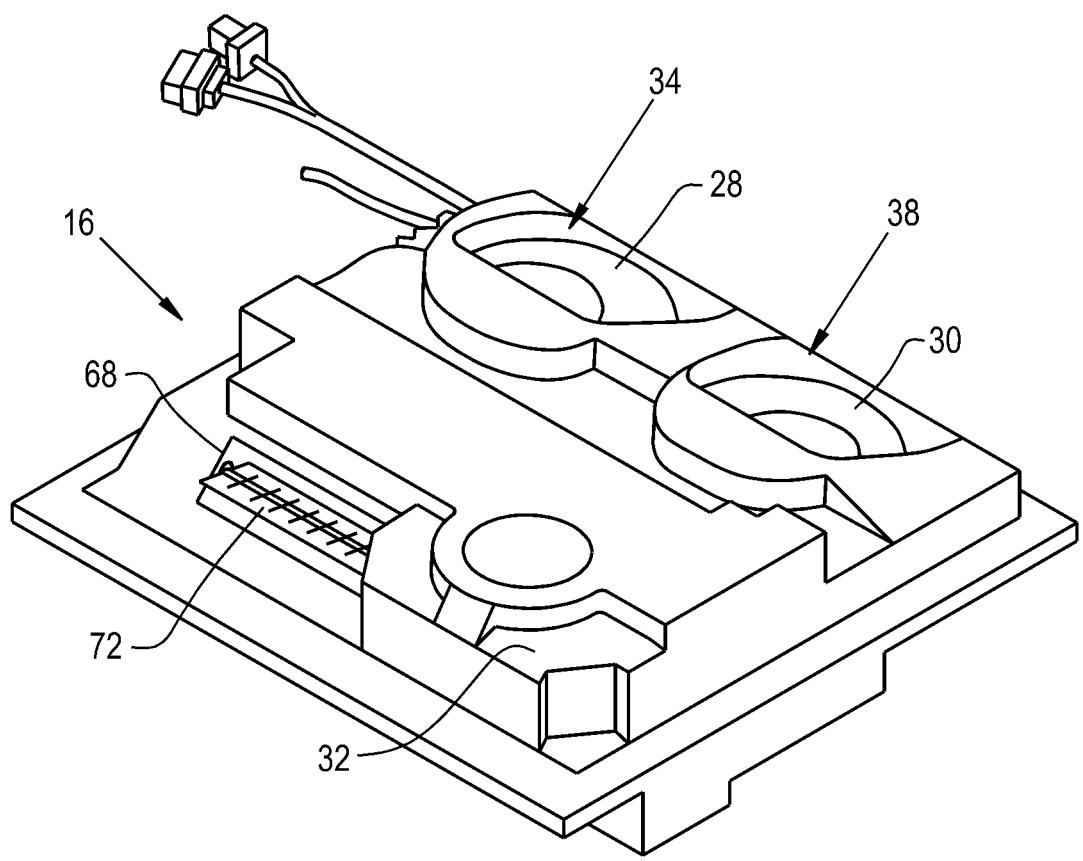
FIG. 3 is a perspective view of the HVAC module used in the HVAC system shown in FIG. 2.

The HVAC module 16 (FIGS. 2 and 3) can be positioned under the floor in the operator cab 10, and includes a first fan 28 and a second fan 30 within a common housing 32. The first fan 28 has an inlet 34 and an outlet (not numbered, within the housing 32), with the first fan inlet 34 being in communication with an interior 36 of the operator cab 10 (FIG. 1). The second fan 30 has an inlet 38 and an outlet (not numbered, within the housing 32), with the second fan inlet 38 being in communication with an exterior ambient environment 40 (FIG. 1). In the illustrated embodiment, the first fan 28 and the second fan 30 are each configured as centrifugal blowers. However, it is to be understood that the fans 28 and 30 could be configured as a different type of fan, such as an axial flow fan.

The recirculation layout 20 on the intake side of the first fan 28 includes an inlet with a recirculation air filter 42 through which recirculation air from the interior 36 is drawn into a recirculation air duct 44. The discharge end of the recirculation air duct 44 is connected with the inlet to the first fan 28, as shown in FIG. 2.

The fresh air layout 22 (FIGS. 2 and 4) on the intake side of the second fan 30 receives both recirculation air from the interior 36 of the cab 10, and the fresh air from the exterior ambient environment 40. To that end, the fresh air layout 22 includes an inlet with a second recirculation air filter 46 through which recirculation air from the interior 36 is drawn into the inlet 38 to the second fan 30. The fresh air layout 22 also includes a fresh air duct 48 which interconnects between the inlet 38 to the second fan 30 and the exterior ambient environment 40. In the embodiment shown, the generally horizontal portion 48A of the fresh air duct 48 is part of the hollow framework of the cab 10 below the rear window, and the generally vertical portion 48B of the fresh air duct 48 is part of the right rear upright post of the hollow framework of the cab 10. A fresh air filter 50 is positioned at the inlet to the fresh air duct 48 extending to the inlet 38 of the second fan 30, above the right access door 52A of the cab 10.

Figure 4:
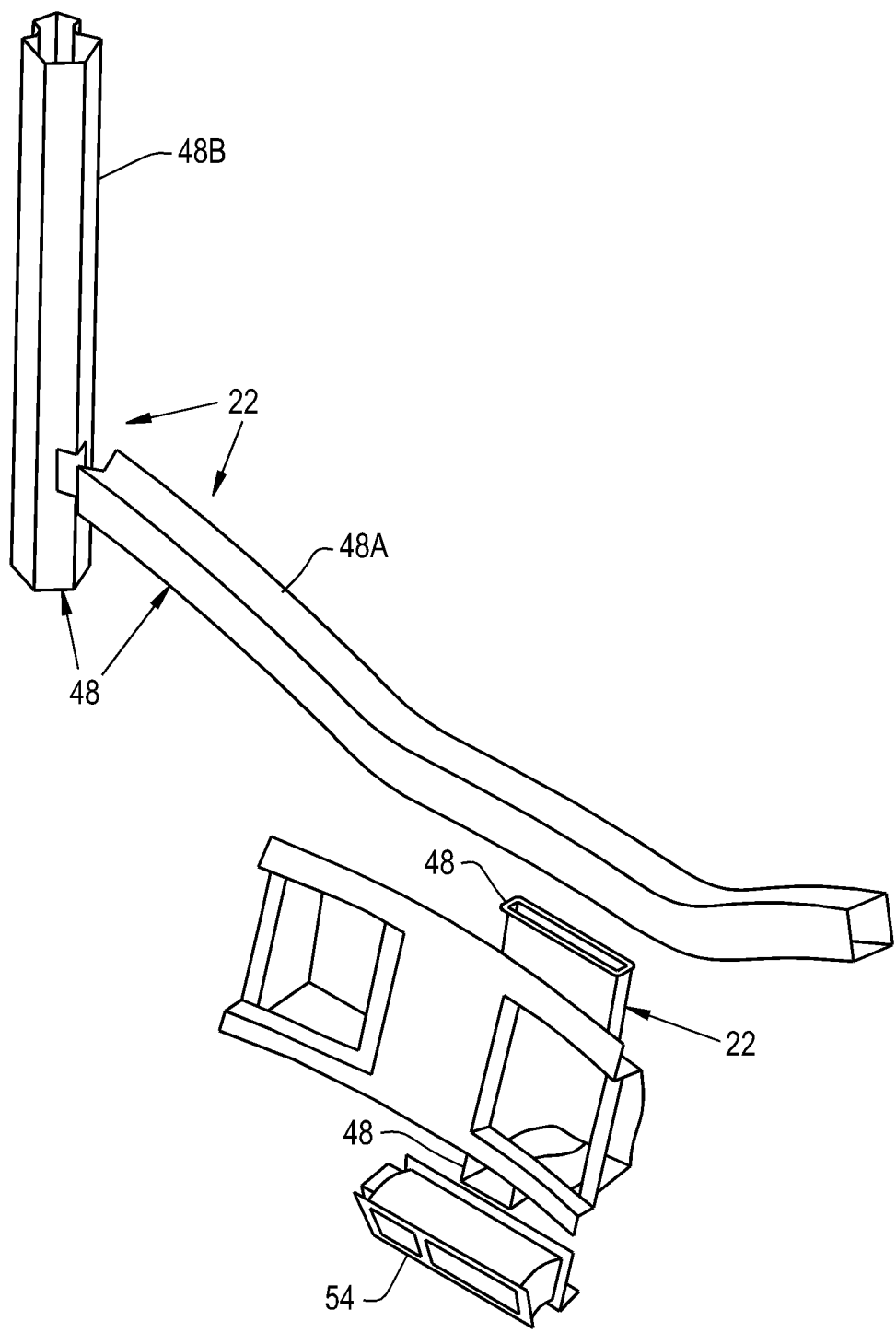
FIG. 4 is a perspective view of a portion of the fresh air layout used with the HVAC system shown in FIG. 2.
Figure 5:
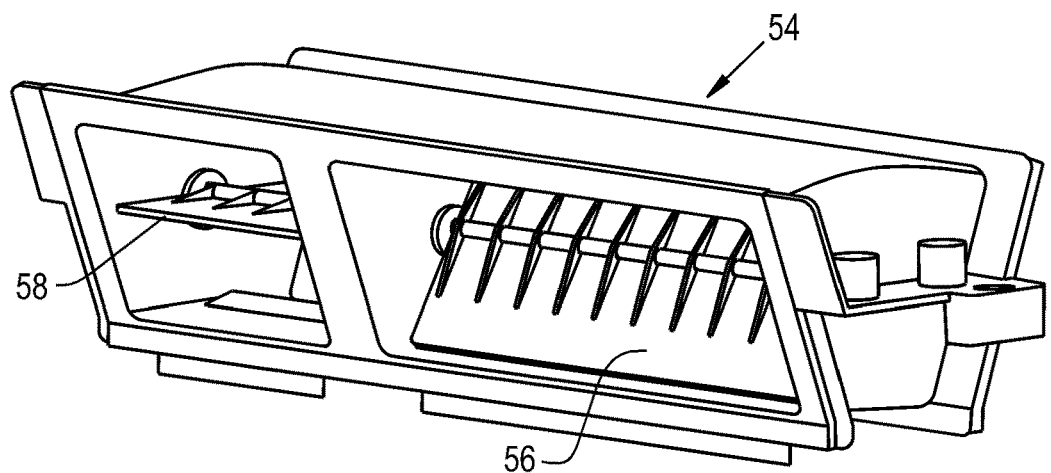
FIG. 5 is a perspective view of a recirculation box used with the HVAC system shown in FIG. 2, and the fresh air layout shown in FIG. 4.

To control the mixture of recirculation air and fresh air to the second fan 30, the HVAC module 16 includes a recirculation box 54 coupled with the inlet 38 to the second fan 30 (FIGS. 2, 4 and 5). The recirculation box 54 has a controllable first door 56 in communication with the interior of the operator cab 10 via the second recirculation air filter 46, and a controllable second door 58 in communication with the exterior ambient environment 40 via the fresh air duct 48 and fresh air filter 50. The positions of the first door 56 and second door 58 may be independently and variably adjusted to control the mixture of recirculation air and/or fresh air that enters the inlet 38 to the second fan 30, as will be described in more detail below.

The housing 32 of the HVAC module 16 internally merges the outlet flows of both the first fan 28 and second fan 30 together. As can be seen in FIG. 2, the front delivery layout 24 is connected to an outlet (not specifically visible) located at the front, bottom of the HVAC module 16. The front delivery layout 24 has a pair of parallel connected front delivery ducts 60A and 60B which both are connected in parallel with an air distribution plenum 62 (FIGS. 2, 6 and 7; which could also be referred to as a distribution box). The air distribution plenum 62 has a plurality of outlets 64 and at least one air flow diverter 66 for selectively opening and closing the plurality of outlets 64. The outlets 64 can function as vents within the operator cab 10 for directing air in specific directions, such as defrost, upper vent, lower vent, feet, etc. The air flow diverter 66A has a generally quarter-circular shape in cross section and the air flow diverter 66B is configured as a flap in the illustrated embodiment. The particular shape of the air flow diverter(s) 66 can vary, depending on the application.

Referring again to FIGS. 2 and 3, the rear delivery layout 26 is connected to an outlet 68 located at the front, top of the HVAC module 16. The rear delivery layout 26 has a pair of parallel connected rear delivery ducts 70A and 70B which are positioned to act as defrost vents on the rear window of the cab 10. A controllable air flow diverter 72 in the form of a rotatable flap is positioned at the outlet 68, and selectively controls an amount of air flowing through the rear delivery ducts 70A and 70B.

An electrical processing circuit 74 controls the various controllable components of the HVAC system 14. For example, the electrical processing circuit 74 can be coupled via appropriate connections (e.g., wired, wireless, BUS, etc.) with the first fan 28, the second fan 30, first door 56, second door 58, air flow diverters 66A and 66B, and air flow diverter 72. The electrical processing circuit 74 can also receive inputs from other suitable devices, such as a right door sensor 76A and a left door sensor 76B indicating an open/close status of the right access door 52A and left access door 52B, respectively. The electrical processing circuit 74 can also be coupled with and/or include other suitable electrical components, such as a video display 78, short and/or long term memories (not shown), etc.

The electrical processing circuit 74 can be configured as a digital and/or analog circuit, and can be part of another controller or a stand-alone controller. For example, in the embodiment shown in FIGS. 1 and 2, the electrical processing circuit 74 is shown as being part of a vehicle control unit (VCU) which can be located in the armrest control panel 80. Alternatively, the electrical processing circuit 74 can be a stand-alone controller which is an integral part of the HVAC module 16, which is coupled with the VCU via suitable connections, such as wired or wireless connections.

During operation, the electrical processing circuit 74 initiates and controls a "fresh air filter regeneration" mode in which the fresh air filter 50 is cleaned by blowing air through the fresh air filter 50 in a reverse direction to the ambient environment 40. This air discharges the dust collected in the fresh air filter 50 to the ambient environment 40.

More specifically, the electrical processing circuit 74 initiates and controls a "fresh air filter regeneration" mode based upon at least three Boolean inputs (logical AND operation). To that end, the electrical processing circuit initiates the fresh air filter regeneration mode dependent upon a time basis. In the illustrated embodiment, the time basis can correspond to a predetermined number of operating hours for the work vehicle 12, and can be determined with an internal clock or timer (not specifically shown). For example, the fresh air filter regeneration mode can be initiated every 50 operating hours of the work vehicle 12.

Rather than using a time dependency, it is also possible to initiate the fresh air filter regeneration mode dependent upon one or more sensed or calculated operating parameters associated with the fresh air filter 50. For example, when the second fan 30 is operating a selected operating speed, the pressure drop through and across the fresh air filter 50 should fall within a known pressure range (delta P). It may be possible to use a pressure sensor 84 on the inlet side of the fresh air filter 50 and a pressure sensor 86 on the discharge side of the fresh air filter, each of which are coupled with the electrical processing circuit 74. The output signals from the pressure sensors 84 and 86 can be used to determine the pressure drop across the fresh air filter 50. When the pressure drop exceeds a predetermined value, some type of indicator can be provided to the operator to manually initiate the fresh air filter regeneration mode, such as text on a video display, an indicator light, alarm, etc. If the fresh air filter 50 is not regenerated and performance further degrades, then the operator can be provided with another indication to manually initiate the fresh air filter regeneration mode, or the electrical processing circuit 74 could possibly automatically initiate the fresh air filter regeneration mode.

The electrical processing circuit 34 also initiates the fresh air filter regeneration mode dependent upon an output signal from the right door sensor 76A indicating that the right door 52A is closed, and from an output signal from the left door sensor 76B indicating that the left door 52B is open. Since the fresh air filter is positioned above the right door 52A, this allows the intake air used in the filter regeneration to be drawn though the open left door 52B and prevents dust exiting the fresh air filter 50 from entering the operator cab 10.

However, the fresh air filter 50 need not be positioned above one of the doors, but can instead be positioned at another suitable location, such as in a fender of the operator cab 12, below the floor of the operator cab 12, etc. In such instances, the electrical processing circuit 34 need not sense whether the right door is closed, but instead can just sense whether one of the access doors 52A or 52B is open to provide a source of fresh air during a fresh air filter regeneration mode. For example, it can be possible to sense whether either or both of the access doors 52A or 52B are open using one or both sensors 76A and/or 76B, without a dependency on whether a specific door (such as access door 52A) is closed. Alternatively, it can be possible to sense another component such as an open window which would provide a source of air during a fresh air filter regeneration mode.

Figure 6:
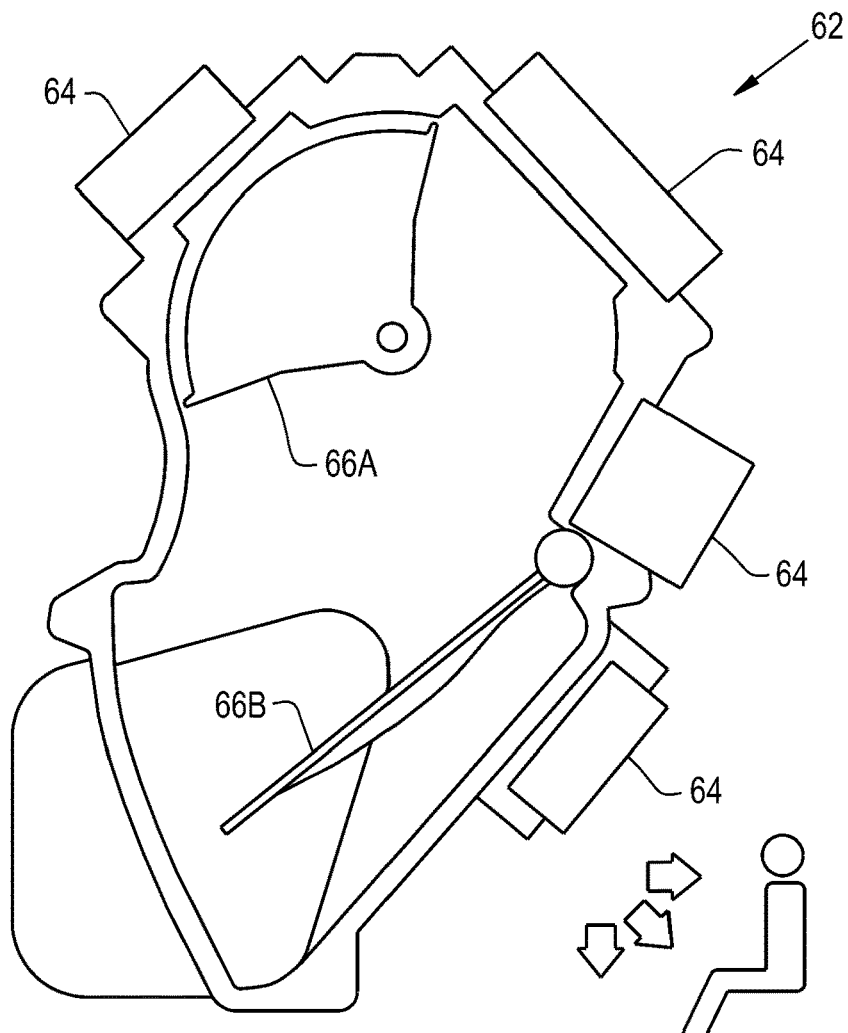
FIG. 6 is a side sectional view showing the interior of an air distribution plenum used in the front delivery layout of the HVAC system shown in FIG. 2, with two different types of air diverters within the air distribution plenum.
Figure 7:
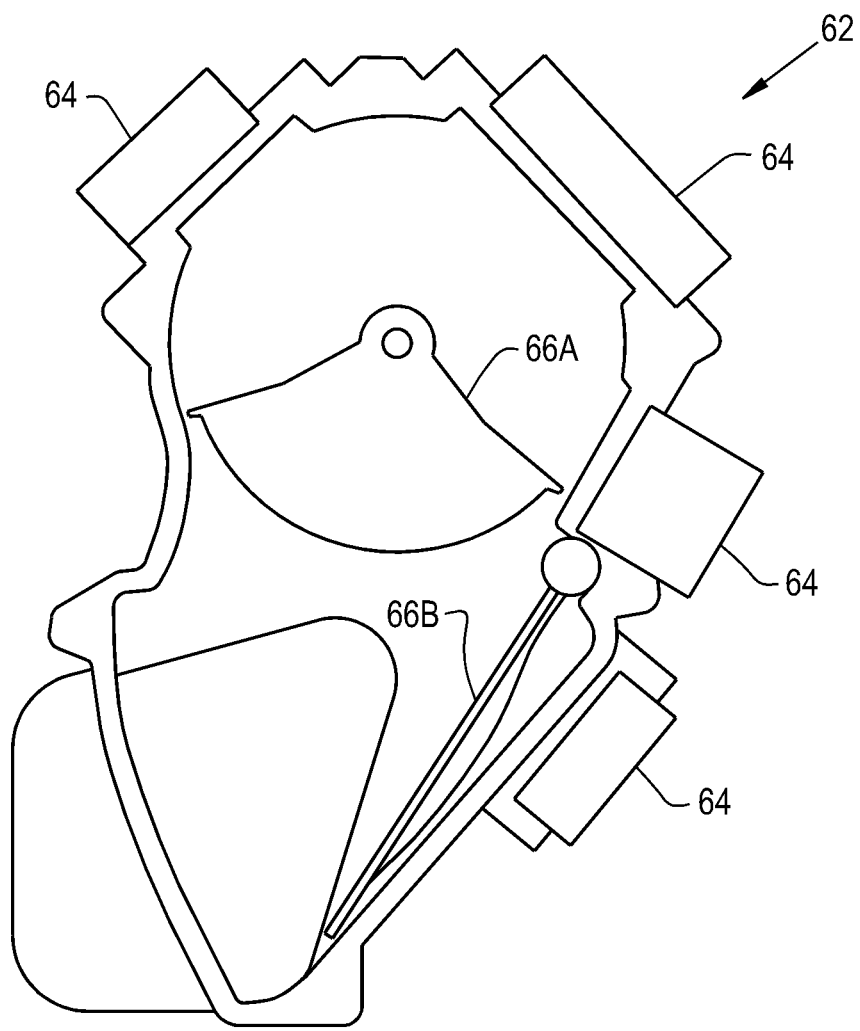
FIG. 7 is a perspective view of the air distribution plenum shown in FIG. 6, with the air diverters in different positions.

The electrical processing circuit 74 controls the air flow diverters 66A, 66B and 72 during the fresh air filter regeneration mode to close the front delivery layout 24 and the rear delivery layout 26. FIG. 6 shows the air flow diverters 66A and 66B positioned to provide filtered and conditioned air to the upper vent, lower vent, and feet. FIG. 7 shows the air flow diverters 66A and 66B with the outlets 64 closed during a fresh air filter regeneration mode.

The electrical processing circuit 74 also controls the first door 56 and second door 58 (as shown in FIG. 5) such that the flow path for recirculation air is closed and the flow path for fresh air is opened. The electrical processing circuit then activates the first fan 28 and deactivates the second fan 30, whereby discharge air from the first fan 28 flows through the second fan 30 in a reverse direction and through the fresh air filter 50 to thereby clean and regenerate the fresh air filter 50. The air flow path during the fresh air filter regeneration mode is schematically shown by the flow path 82 shown in FIG. 1.

Figure 8:
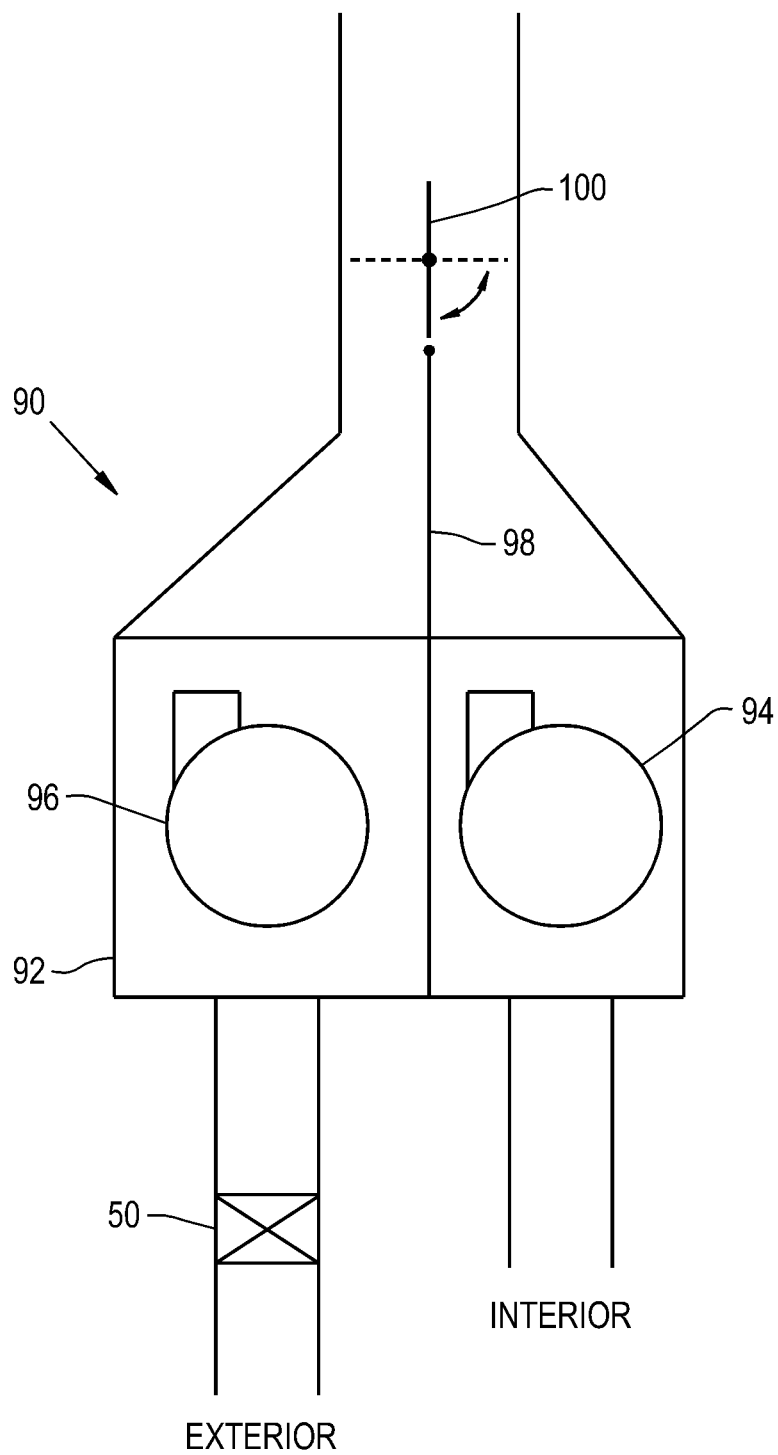
FIG. 8 is a schematic illustration of another embodiment of an HVAC system of the present invention.

Referring now to FIG. 8, there is shown a schematic illustration of another embodiment of an HVAC system 90 of the present invention. In this embodiment, an HVAC module 92 includes the recirculation fan 94 and pressurization fan 96, similar to the HVAC system 14 shown in FIGS. 1 and 2. However, the HVAC system 90 has a flow separating wall 98 positioned on the downstream side from the HVAC module 92 and an air flow diverter 100 positioned in alignment with the wall 98. The air flow diverter 100, configured as a butterfly type valve in the illustrated embodiment, can be controllably positioned between an open position (shown in a sold line) and a closed position (shown in a dashed line) with the electrical processing circuit 74. When in the fresh air filter regeneration mode, and with the air flow diverter 100 in the closed position, the air that is discharged from the recirculation fan 94 flows in a reverse direction through the pressurization fan 96 to clean the fresh air filter 50.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A heating ventilating and air conditioning (HVAC) system for an operator cab of a work vehicle, the HVAC system including:
    a first fan having an inlet and an outlet, the first fan inlet being in communication with an interior of the operator cab;
    a second fan having an inlet and an outlet, the second fan inlet being in communication with an exterior ambient environment;
    a fresh air filter positioned in communication with the inlet of the second fan;
    an air duct arrangement in communication with the first fan outlet and the second fan outlet; and
    at least one air flow diverter positioned within the air duct arrangement for selectively, diverting air flowing through the air duct arrangement; and
    wherein in a "fresh air filter regeneration" mode the at least one air flow diverter closes the air duct arrangement, the first fan is activated, and the second fan is deactivated, whereby air discharged by the first fan is diverted to the second fan for flow through the second fan in a direction from the second fan outlet to the second fan inlet before flowing through the fresh air filter.

2. The HVAC system of claim 1, wherein the HVAC system includes an HVAC module having a recirculation box coupled with the second fan, the recirculation box controlling an amount of recirculation air and fresh air that are drawn into the second fan, the recirculation box having a controllable first door in communication with the interior of the operator cab, and a controllable second door in communication with the exterior ambient environment, the first door being closed and the second door being opened during said fresh air filter regeneration mode.

3. The HVAC system of claim 1, wherein:
    the air duct arrangement includes at least one distribution plenum, each said at least one distribution plenum having at least one outlet and an inlet in communication with the first fan outlet and the second fan outlet, each said at least one distribution plenum including at least one of said at least one air flow diverter; and
    an electrical processing circuit is configured in said fresh air filter regeneration mode to position the at least one air flow diverter to close each said outlet of each said at least one distribution plenum.

4. The HVAC system of claim 1, wherein:
    said fresh air filter regeneration mode requires that an output signal received from a door sensor of the operator cab indicates that an access door is open.

5. The HVAC system of claim 1, wherein an electrical processing circuit coupled with the first fan and the second fan initiates said fresh air filter regeneration mode dependent upon a time basis.

6. The HVAC system of claim 4, wherein an electrical processing circuit coupled with the first fan and the second fan initiates said fresh air filter regeneration mode when an output signal received from a second door sensor of the operator cab indicates that a second door is closed.

7. The HVAC system of claim 5, wherein the time basis corresponds to a predetermined number of operating hours for the work vehicle.

8. The HVAC system of claim 3, wherein the air duct arrangement includes a front delivery layout having at least one of said at least one air flow diverter, and a parallel delivery layout having at least one of said at least one air flow diverter, said electrical processing circuit controlling each said air flow diverter during said fresh air filter regeneration mode to close each of said front delivery layout and said parallel delivery layout.

9. The HVAC system of claim 8, wherein:
    the HVAC system includes an HVAC module containing each of the first fan and the second fan; and
    the front delivery layout includes a first distribution plenum of said at least one distribution plenum having a plurality of outlets and an inlet in communication with the first fan outlet and the second fan outlet, said first distribution plenum including at least one of said at least one air flow diverter for selectively opening and closing said plurality of outlets.

10. The HVAC system, of claim 1, wherein said fresh air filter regeneration mode is initiated dependent upon at least one sensed or calculated operating parameter associated with the fresh air filter.

11. The HVAC system of claim 10, wherein the at least one sensed or calculated operating parameter includes a pressure drop across the fresh air filter.

12. The HVAC system of claim 1, wherein the first fan is a recirculation blower and the second fan is a pressurization blower.

13. A work vehicle including the HVAC system according to any one of the preceding claim.

\* \* \* \* \*